United States Patent
Südow (10) Patent No.: US 12,066,290 B2
(45) Date of Patent: *Aug. 20, 2024

(54) CALIBRATION OF A MAGNETOMETER IN A TOWED OBJECT TELEMETRY UNIT BASED ON TURN DATA

(71) Applicant: PGS Geophysical AS, Oslo (NO)

(72) Inventor: Mattias Südow, Kista (SE)

(73) Assignee: PGS Geophysical AS, Oslo (NO)

( * ) Notice: Subject to any disclaimer, the term of this patent is extended or adjusted under 35 U.S.C. 154(b) by 237 days.

This patent is subject to a terminal disclaimer.

(21) Appl. No.: 17/324,370

(22) Filed: May 19, 2021

(65) Prior Publication Data
US 2021/0270607 A1    Sep. 2, 2021

Related U.S. Application Data

(62) Division of application No. 15/834,182, filed on Dec. 7, 2017, now Pat. No. 11,041,720.

(60) Provisional application No. 62/433,370, filed on Dec. 13, 2016.

(51) Int. Cl.
| | |
|---|---|
| G01C 17/38 | (2006.01) |
| G01C 17/28 | (2006.01) |
| G01V 3/15 | (2006.01) |
| G01V 13/00 | (2006.01) |
| G01V 1/20 | (2006.01) |
| G01V 1/38 | (2006.01) |
| G01V 3/12 | (2006.01) |

(52) U.S. Cl.
CPC .............. *G01C 17/38* (2013.01); *G01C 17/28* (2013.01); *G01V 3/15* (2013.01); *G01V 13/00* (2013.01); *G01V 1/20* (2013.01); *G01V 1/3817* (2013.01); *G01V 3/12* (2013.01)

(58) Field of Classification Search
CPC .......... G01C 17/38; G01C 17/28; G01V 3/15; G01V 13/00; G01V 1/20; G01V 1/3817; G01V 3/12
USPC ........................................................ 73/1.76
See application file for complete search history.

(56) References Cited

U.S. PATENT DOCUMENTS

| | | | |
|---|---|---|---|
| 4,539,760 A | 9/1985 | Marchent et al. | |
| 4,644,506 A | 2/1987 | Cretin et al. | |
| 4,912,682 A | 3/1990 | Norton et al. | |

(Continued)

FOREIGN PATENT DOCUMENTS

| | | | | |
|---|---|---|---|---|
| CN | 105388533 A | * | 3/2016 | |
| WO | WO-2009095577 A1 | * | 8/2009 | ............. B66C 13/46 |
| WO | 2014186636 | | 11/2014 | |

OTHER PUBLICATIONS

Communication Pursuant to Article 94(3) EPC Examination Report for related EP Application No. 17816730.0, mailed Nov. 11, 2021 (6 pgs).

(Continued)

*Primary Examiner* — Marrit Eyassu (57) ABSTRACT

Roll data can be acquired from a magnetometer and an accelerometer of a towed object telemetry unit coupled to a towed object during rolls of the towed object in two or more different headings. The magnetometer can be calibrated based on the roll data. Turn data can be acquired from the magnetometer and the accelerometer during a turn of the towed object from a first heading to a second heading. The magnetometer can be further calibrated based on the turn data.

17 Claims, 6 Drawing Sheets

(56) References Cited

U.S. PATENT DOCUMENTS

| | | | | |
|---|---|---|---|---|
| 6,111,817 | A | * | 8/2000 | Teeter .................. G01V 1/3826 367/13 |
| 8,136,383 | B2 | | 3/2012 | Goujon et al. |
| 8,528,381 | B2 | | 9/2013 | Rodney et al. |
| 8,593,905 | B2 | | 11/2013 | Gagliardi et al. |
| 9,354,343 | B2 | | 5/2016 | Roberts et al. |
| 2008/0071492 | A1 | | 3/2008 | Skvortsov et al. |
| 2009/0056411 | A1 | | 3/2009 | Goujon et al. |
| 2009/0099730 | A1 | * | 4/2009 | McClure .............. G05D 1/0278 701/41 |
| 2011/0007602 | A1 | | 1/2011 | Welker et al. |
| 2011/0077889 | A1 | | 3/2011 | Vogt |
| 2012/0002504 | A1 | | 1/2012 | Muyzert et al. |
| 2012/0095629 | A1 | | 4/2012 | Fjellstad et al. |
| 2012/0134234 | A1 | * | 5/2012 | Roberts .................... G01V 1/38 367/19 |
| 2013/0006573 | A1 | * | 1/2013 | Brunner ................. G01C 21/20 702/141 |
| 2015/0016216 | A1 | * | 1/2015 | Sudow ................... G01V 13/00 367/13 |
| 2015/0204667 | A1 | * | 7/2015 | Fowler ................. G01C 21/188 33/355 R |
| 2015/0226554 | A1 | * | 8/2015 | Eick ........................ G01C 17/38 702/94 |
| 2016/0195626 | A1 | * | 7/2016 | Rinnan ................. G01V 1/3835 367/17 |
| 2016/0282494 | A1 | | 9/2016 | Leboeuf | |

OTHER PUBLICATIONS

Miranda, et al., "Efficient Simultaneous Calibration of a Magnetometer and an Accelerometer"; (May 20, 2015) (10 pgs) http://conradomiranda.com/wp-content/papercite-data/pdf/miranda2015b.pdf.

Madgwick, "Automated calibration of an accelerometers, magnetometers and gyroscopes—A feasibility study"; (Sep. 20, 2010) (11 pgs) https://pdfs.semanticscholar.org/20e3/3f4649c94e7b4673cc78bf66ee2c26c91e46.pdf.

Stratton, et al., "Using Strategic Movement to Calibrate a Neural Compass: A Spiking Network for Tracking Head Direction in Rats and Robots"; PLoS ONE[www.plosone.org], vol. 6, Issue 10 (Oct. 2011) (15 pgs) http://journals.plos.org/plosone/article/file?id=10.1371/journal.pone.0025687&type=printable.

Tereshkov, "A Simple Observer for Gyro and Accelerometer Biases in Land Navigation Systems"; Topcon Positioning Systems LLC, (2015) (14 pgs) https://arxiv.org/ftp/arxiv/papers/1501/1501.06618.pdf.

Tereshkov, "An Intuitive Approach to Inertial Sensor Bias Estimation"; Topcon Positioning Systems LLC, (2012) (6 pgs) https://arxiv.org/ftp/arxiv/papers/1212/1212.0892.pdf.

Kongsberg, eBird, "Lateral steering and depth control of seismic streamers"; (2 pgs) (Oct. 2009) https://www.km.kongsberg.com/ks/web/nokbg0397.nsf/AllWeb/F34C5DEAD3898F14C125764D004A3456/$file/eBird_oct09.pdf?OpenElement.

International Preliminary Report on Patentability for related European PCT Application PCT/EP2017/082436, mailed Jun. 27, 2019 (14 pgs).

Rule 161/162 EPC Communication for related European National Phase Application 17816730.0, mailed Jul. 19, 2019 (3 pgs).

International Search Report & Written Opinion for related European PCT Application PCT/EP2017/082436, mailed May 18, 2018 (21 pgs).

Gee, et al., "A surface-towed vector magnetometer"; Geophysical Research Letters, vol. 29, No. 14, 1670 (Jul. 18, 2002).

\* cited by examiner

CALIBRATION OF A MAGNETOMETER IN A TOWED OBJECT TELEMETRY UNIT BASED ON TURN DATA

CROSS-REFERENCE TO RELATED APPLICATIONS

This application is a Divisional of U.S. Non-Provisional application Ser. No. 15/834,182, filed Dec. 7, 2017, which claims priority to U.S. Provisional Application 62/433,370, filed Dec. 13, 2016, all of which are incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the water surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

DETAILED DESCRIPTION

This disclosure is related generally to the field of marine surveying. Marine surveying can include, for example, seismic surveying or electromagnetic surveying, among others. During marine surveying, one or more sources are used to generate wavefields, and receivers (towed and/or ocean bottom) receive energy generated by the sources and affected by the interaction with a subsurface formation. The receivers thereby collect survey data, which can be useful in the discovery and/or extraction of hydrocarbons from subsurface formations.

A towed object, such as a source, a receiver, or a streamer, may be towed behind a marine survey vessel to collect the survey data. A streamer can be a marine cable assembly that can include receivers and electrical or optical connections to transmit information collected by the receivers to the marine survey vessel. The streamer can include receivers such as seismic receivers (e.g., hydrophones, geophones, etc.) or electromagnetic receivers. A towed object can include a towed object telemetry unit having a magnetometer, an accelerometer, and/or a gyroscope. Any or all of the magnetometer, accelerometer, and gyroscope may be referred to as a compass. The compass can be used to determine a heading or additional spatial and navigational information for the towed object.

A multi-dimensional calibration of the compass can be performed to render high quality heading values. Calibration can include calibration performed prior to or after deployment. In some instances, an initial or factory calibration can be performed prior to deployment. In some instances, in-sea calibration can be performed after towed object deployment in a body of water to further calibrate the compass. The compass can be placed in different orientations to generate and record calibration telemetry data that corresponds to the different orientations. The calibration telemetry data can be compared to an expected telemetry field shape. The differences between the recorded data and the expected telemetry field shape can be used to determine calibration parameters to correct for deviations in the compass being tested. For example, the towed object can be rolled while oriented in different headings such that the compass generates roll data. Roll data refers to the data that is output from the compass based on the object being rolled. In areas of low magnetic dip, the quality of calibration resulting from this method can produce accurate compass readings. However, as the magnetic dip angle increases, the roll data only covers a small portion of the expected telemetry field shape, such as an ellipsoid, which renders relatively poor quality calibration parameters. As such, readings from a compass calibrated according to such a method can be significantly off. For example, the readings can be off by more than 10 degrees. In the northern hemisphere, the magnetic field generally points toward the magnetic north pole, however the magnetic field also points down. The downward (as opposed to horizontal) portion of the magnetic field is referred to as magnetic dip and it is greatest near the magnetic poles and diminishes closer to the equator.

To overcome these limitations, at least one embodiment of the present disclosure can include acquiring roll data from a magnetometer and an accelerometer of a towed object telemetry unit coupled to a towed object during a plurality of rolls of the towed object in two or more different headings, calibrating the magnetometer based on the roll data, acquiring turn data from the magnetometer and the accelerometer during a turn of the towed object from a first heading to a second heading, and further calibrating the magnetometer based on the turn data. Turn data refers to the data that is output from the compass based on the object being turned.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 166 may reference element "66" in FIG. 1C, and a similar element may be referenced as 666 in FIG. 6. Multiple analogous elements within one figure may be referenced with a reference numeral followed by a hyphen and another numeral or a letter. For example, 110-1 may reference element 10-1 in FIGS. 1 and 110-2 may reference element 10-2, which can be analogous to element 10-1. Such analogous elements may be generally referenced without the hyphen and extra numeral or letter. For example, elements 110-1 and 110-2 may be generally referenced as 110. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1A:
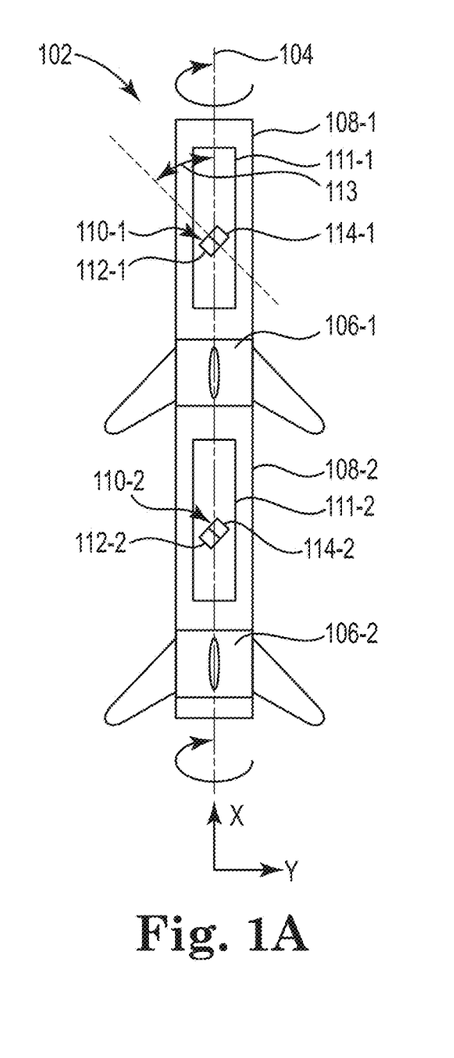
FIG. 1A illustrates a bottom view of various sections of a towed object.

FIG. 1A illustrates a bottom view of various sections 108-1, 108-2 of a towed object 102. A longitudinal axis 104 of the towed object 102 is illustrated as being aligned with a direction along the x-axis in which the towed object is being towed. A towed object 102 can be any object towed by a marine vessel such as a marine survey vessel. Examples of towed objects 102 include a source, a receiver, or a streamer. In the embodiment illustrated in FIG. 1A, the towed object 102 is depicted as a portion of a streamer including a first streamer section 108-1 and a second streamer section 108-2. A first position control device 106-1 is coupled to the first streamer section 108-1 and a second position control device 106-2 is coupled to the second streamer section 108-2. As illustrated, the first position control device 106-1 may be said to be coupled to both the first streamer section 108-1 and the second streamer section 108-2, however embodiments are not so limited as there may be other portions of the towed object 102 between the first position control device 106-1 and the second position control device 106-2. A position control device 106 can include a plurality of wings as illustrated in more detail in FIG. 1B. A position control device 106 can be, for example, a steering control device or a depth control device.

The first streamer section 108-1 is illustrated as including a first towed object telemetry unit 111-1 mounted thereto. The second streamer section 108-2 is illustrated as including a second towed object telemetry unit 111-2 mounted thereto. The first towed object telemetry unit 111-1 includes a compass 110-1, which includes a first accelerometer 112-1 and a first magnetometer 114-1. As illustrated, the first compass 110-1 has a mounting angle offset 113 from a longitudinal axis of the towed object telemetry unit, which may generally align with the longitudinal axis 104 of the towed object 102. The longitudinal axis 104 of the towed object 102 can generally align with a direction in which the towed object is towed. The mounting angle offset 113 can aid in producing meaningful data in about three axes during a rotation about the longitudinal axis 104. If the mounting angle offset 113 were zero (if the compass 110-1 was aligned with the longitudinal axis 104) then a roll about the longitudinal axis 104 would only produce data about two axes. In at least one embodiment the mounting angle offset 113 is 45 degrees, however embodiments are not limited to a particular mounting angle offset 113.

Although not specifically illustrated, the compasses 110 can include a gyroscope in addition to the accelerometer 112 and the magnetometer 114. The magnetometer 114 can be a digital magnetic field sensor. The accelerometer 112 can be a digital linear acceleration sensor. The gyroscope can be a digital angular rate sensor. The magnetometer 114, accelerometer 112, and gyroscope can be packaged individually or collectively, in any combination, as a system on a chip. Any or all of the magnetometer 114, accelerometer 112, and gyroscope can be a tri-axis microelectromechanical system (MEMS). Any or all of the magnetometer 114, accelerometer 112, and gyroscope may be referred to as a compass 110. The compass 110 can be used to determine a heading or additional spatial and navigational information for the towed object 102.

The towed object 102 can be rolled using the position control devices 106. For example, the wings of the position control devices 106 can be adjusted to cause the towed object 102 to roll as described in more detail with respect to FIG. 1B. In at least one embodiment, the entire towed object 102 or multiple sections of the towed object 102 can be rolled along the longitudinal axis 104 using a plurality of the position control devices 106. Such embodiments can be beneficial for reducing a total time involved in performing the towed object 102 rolls for calibration purposes. Collective rolling of the entire towed object 102 can be used for relatively shorter towed objects, for example, as compared to streamers. In at least one embodiment, the towed object 102 can be rolled on a section-by-section basis. For example, the first section 108-1 can be rolled by operation of the first position control device 106-1 and then the second section 108-2 can be rolled by operation of the second position control device 106-2. Such embodiments can be beneficial particularly for longer towed objects 102, such as streamers, where it may be impractical to roll the entire towed object 102 collectively with a fine degree of control over the roll. The roll of the towed object 102, or a section 108 thereof, in any particular heading can include a single roll in a single direction, or multiple rolls in one or more directions. The direction of the roll can be clockwise or counterclockwise along the longitudinal axis 104 of the towed object 102.

Figure 1B:
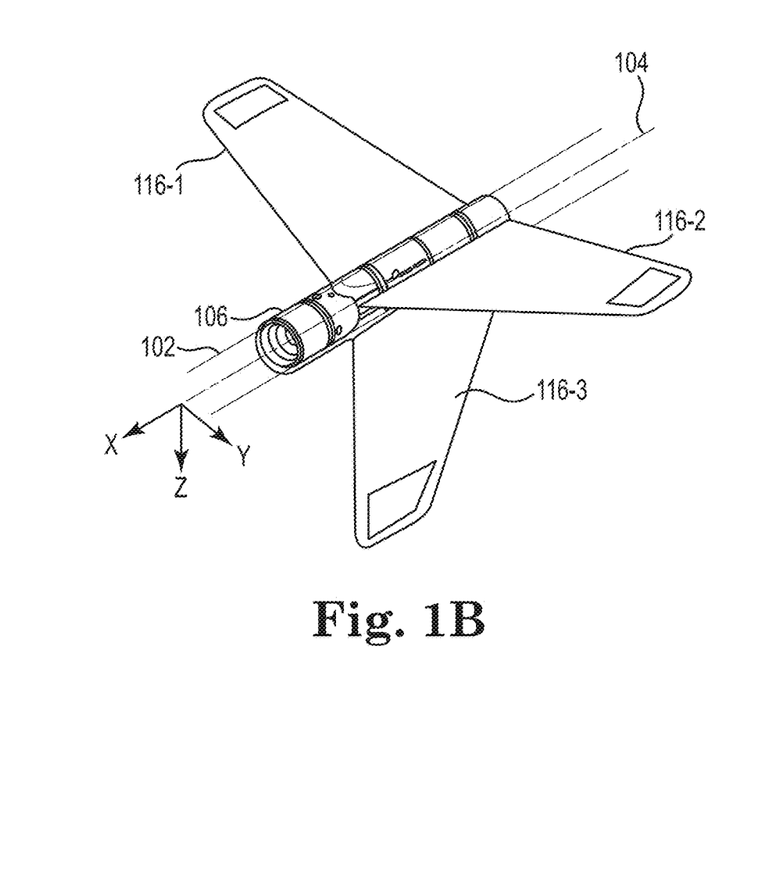
FIG. 1B illustrates a perspective view of a position control device of a towed object.

FIG. 1B illustrates a perspective view of a position control device 106 of a towed object 102. The position control device 106 can include a central portion that can be attached to a towed object 102 in line with a longitudinal axis 104 of the towed object 102 along the x-axis. The z-axis generally indicates depth, for example toward the surface of the earth. The orientation of the axes illustrated in FIG. 1B is analogous to that illustrated in FIG. 1A. The position control device 102 can include a plurality of wings 116 extending from the central portion. The embodiment illustrated in FIG. 1B includes three wings 116-1, 116-2, 116-3 attached to the central portion of the position control device 106, however embodiments are not limited to position control devices 106 including three wings 116 as the position control devices 106 can include more or fewer wings 116. The wings 116 can then be adjusted to generate a force, such as a lifting force and/or to generate a torque. Adjustment of the wings 116 can include rotation of the wings 116 or control surfaces thereon.

In at least one embodiment, the wings 116 can be rotatably coupled to the central portion of the position control device 106 such that they can rotate. In at least one embodiment, the wings can rotate about an axis that is perpendicular to longitudinal axis 104. While being towed, for example along the longitudinal axis 104, rotation of the wings 116 can cause a force to be applied to the central portion of the position control device 106 and thus to the towed object 102. In at least one embodiment, the wings 116 can be fixedly coupled to the central portion of the position control device 106 such that they cannot rotate with respect to the central portion. For embodiments in which the wings 116 are fixedly coupled to the central portion, each wing 116 can include one or more control surfaces (a portion of the wing 116) that can pivot or otherwise move in relation to a remainder of the wing 116 analogously to an aileron. While being towed, movement of the control surface can apply a force to the central portion of the position control device 106 and thus to the towed object 102. By way of example, the first wing 116-1 and the second wing 116-2 can function as ailerons and elevators for the position control device 106, controlling pitch and roll, while the third wing 116-3 can function as a rudder, controlling yaw of the position control device 106. However, all three wings 116-1, 116-2, 116-3 can be operated collectively to cause the position control device 106 to roll. For example, while being towed, the wings 116-1, 116-2, 116-3, or the control surfaces thereon, can all be deflected in a same direction to cause the position control device 106 to roll.

Figure 1C:
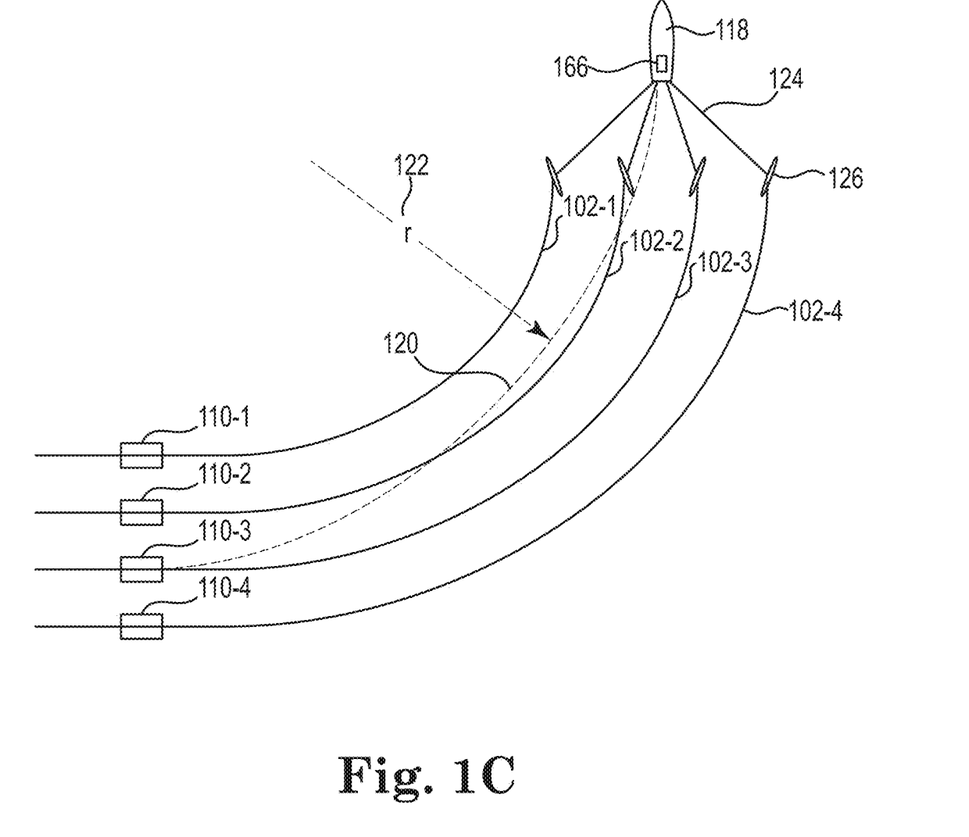
FIG. 1C illustrates a top view of a turn of towed objects.

FIG. 1C illustrates a top view of a turn of towed objects 102. A marine survey vessel 118 can tow a plurality of towed objects 102-1, 102-2, 102-3, 102-4, such as streamers, each having a respective compass 110-1, 110-2, 110-3, 110-4. Although only one compass 110 is illustrated for each towed object 102, embodiments are not limited to any particular quantity of compasses 110 per towed object 102. FIG. 1C illustrates a simplified example of towing where the towed objects 102 can be coupled to the marine survey vessel 118 via tow lines or lead-in lines 124 and paravanes 126. Actual towing setups may include more elaborate or complicated arrangements of equipment, which are not illustrated here so as not to obscure the details of the present disclosure. Furthermore, although only four towed objects 102 are illustrated, embodiments are not limited to any particular quantity of towed objects 102 or type of towed object 102.

The dashed line from the stern of the marine survey vessel 118 indicates a path 120 of travel of the marine survey vessel 118 along a turn of radius r 122. As illustrated, in some instances, the towed objects 102 can bend along the turn. However, in some instances, the towed objects 102 may not be flexible and may not bend along a turn. The compasses 110 will generally follow the path of the marine survey vessel 118 along the path of the towed objects 102 as the turn progresses.

The towed objects 102 can be coupled to a controller 166. The controller can be onboard the marine survey vessel 118 that tows the towed objects 102. The coupling between the controller 166 and the towed objects 102 for communication purposes can be wired or wireless. For example, electrical or optical cabling can run along or within the towed objects 102 and be coupled to towed object telemetry units (not specifically illustrated in FIG. 1C) on the towed objects 102 and the position control devices (not specifically illustrated in FIG. 1C) as well as the controller 166. The cabling can also be coupled to the compasses 110 (e.g., via being coupled to the towed object telemetry units). As another example, the towed object 102, the telemetry units, and/or the position control devices can be in wireless communication with the controller 166. As described in more detail herein, the controller 166 can control operation of the position control devices, receive data from the towed object telemetry units, and calibrate the compasses 110. For example, the controller 166 can receive turn data from the compasses 110 during the turn of the towed objects 102, as illustrated in FIG. 1C. Likewise, the controller 166 can receive roll data from the compasses 110 during a roll of the towed object as illustrated in FIG. 1A.

Figure 5:
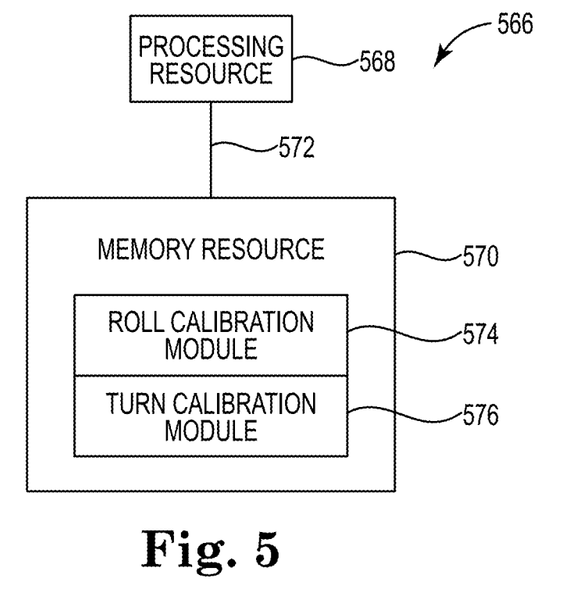
FIG. 5 illustrates a diagram of a machine for calibration of a magnetometer in a towed object telemetry unit based on turn data.

The controller 166 can include processing resources and memory resources, such as is described in more detail with respect to FIG. 5. The controller 166, through executable instructions and/or hardwired circuitry, can be configured to use a first position control device 106-1 to roll a first section 108-1 of the towed object 102 and receive roll data from the first towed object telemetry unit 111-1. The controller 166 can be configured to calibrate the first magnetometer 114-1 based on the first roll data. The controller 166 can use the second position control device 106-2 to roll the second section 108-2 of the towed object 102 and receive second roll data from the second towed object telemetry unit 111-2. For example, the controller 166 can be configured to adjust a plurality of wings 116 of the respective position control devices 106 to roll the respective sections 108 of the towed object 102 along its longitudinal axis 104. The controller 166 can be configured to calibrate the second magnetometer 114-2 based on the second roll data. The controller 166 can be configured to receive first turn data from the first towed object telemetry unit 111-1 and second turn data from the second towed object telemetry unit 111-2 as a result of a turn of the towed object 102 from a first heading to a second heading. The controller 166 can be configured to further calibrate the first magnetometer 114-1 based on the first turn data and to further calibrate the second magnetometer 114-2 based on the second turn data.

The controller 166 can be configured to receive first straight tow data from the first towed object telemetry unit 111-1 and second straight tow data from the second towed object telemetry unit 111-2 as a result of the towed object 102 being towed without turning for a period of time. The controller 166 can be configured to further calibrate the first magnetometer 114-1 based on the first turn data and the first straight tow data. The controller 166 can be configured to further calibrate the second magnetometer 114-2 based on the second turn data and the second straight tow data. In at least one embodiment, the controller 166 can be configured to instruct the marine survey vessel 118 to perform the turn from the first heading to the second heading. For example, the navigational controls of the marine survey vessel 118 may be slaved to the controller 166. Such embodiments may be beneficial for generating more accurate turn data by providing finer control over the turn. However, in at least one embodiment, the turn may be performed manually without direction from the controller 166. In at least one embodiment, for calibration purposes, the controller 166 can be configured to use the first position control device 106-1 and the second position control device 106-2 to turn the towed object 102 from the first heading to the second heading (rather than turning using the marine survey vessel 118). For example, such a turn may be a relatively small change in heading as compared to the change in heading illustrated in FIG. 1C, and may be particularly useful for embodiments in which the towed object 102 is relatively short compared to a typical streamer. As such, turn data can be generated for the towed object 102 without requiring the marine survey vessel 118 to change heading, which may be costly and inefficient.

Figure 2:
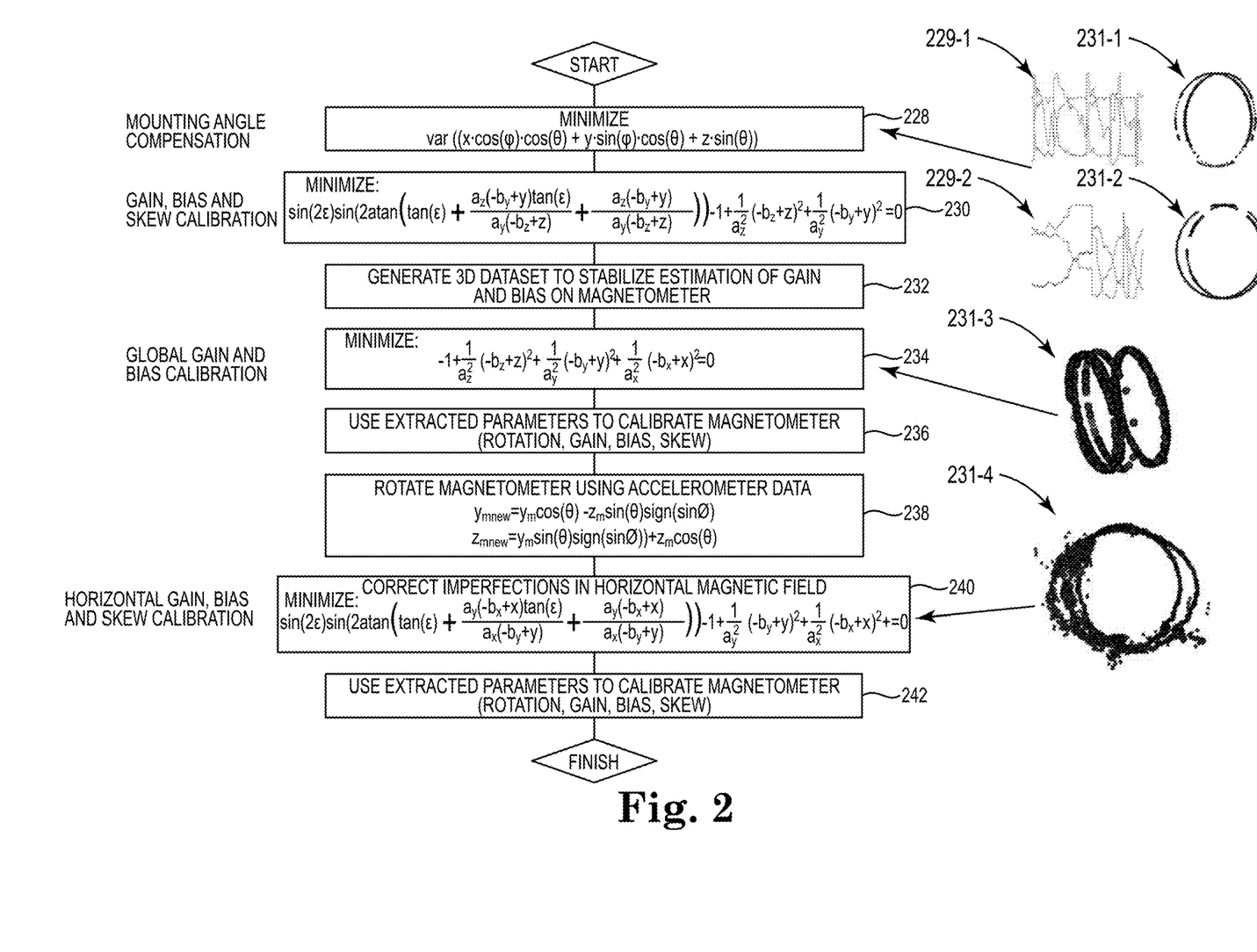
FIG. 2 illustrates a method flow diagram with examples of accompanying telemetry data for calibration of a magnetometer in a towed object telemetry unit based on turn data.

FIG. 2 illustrates a method flow diagram with examples of accompanying telemetry data for calibration of a magnetometer in a towed object telemetry unit based on turn data. In at least one embodiment, the method can be performed by a controller, such as the controller 166 illustrated in FIG. 1C. At block 228, the method can include compensating the compass for the mounting angle offset of the compass. It can be beneficial to have the magnetic data from the compass be oriented with respect to the longitudinal axis of the towed object or the longitudinal axis of the towed object telemetry unit rather than the orientation of the compass in the streamer telemetry unit, which would generally not align with the other axes as illustrated in FIG. 1A. The mounting angle offset compensation can be performed by minimizing the expression:

$$\text{var}((x \cdot \cos(\varphi) \cdot \cos(\theta) + y \cdot \sin(\varphi) \cdot \cos(\theta) + z \cdot \sin(\theta))). \quad (1)$$

For the representation of data in spherical coordinates, $\theta$ is the angle from the direct vertical (up) and $\varphi$ is the angle in the horizontal plane (azimuth from North or x in Cartesian coordinates). The graph of raw data 229-1 represents a typical time series input to block 228. The raw telemetry data 231-1 is shown as ellipses that represent the scatterplot of the x-z and y-z data in 229-1.

At block 230, the method can include calibrating the compass for gain, bias, and skew by minimizing the equation (cost function):

$$\sin(2\varepsilon)\sin\left(2\tan^{-1}\left(\tan(\varepsilon) + \frac{a_z(-b_y+y)\tan\varepsilon}{a_y(-b_z+z)} + \frac{a_z(-b_y+y)}{a_y(-b_z+z)}\right)\right) - \\ 1 + \frac{1}{a_z^2}(-b_Z+z)^2 + \frac{1}{a_y^2}(-b_y+y)^2 = 0. \quad (2)$$

$\varepsilon$ is the skew or angular difference where the sensor axis is not perfectly orthogonal. Gain is generally denoted by "a" with subscripts indicating axial components. Bias is generally denoted by "b" with subscripts indicating axial components. The graph of raw data 229-2 represents a typical time series input to block 230. The telemetry data 231-2 is shown as circles that represent the scatterplot of the x-z and y-z data in 229-2.

At block 232, the method can include generating a three dimensional (3D) dataset to stabilize the estimation of gain and bias on the magnetometer. The 3D dataset can be generated, for example, by concatenating data from streamer rolls performed in two or more different headings, or by synthesis based on the calibration parameters extracted in block 228 and block 230.

At block 234, the method can include calibrating the compass for global gain and bias by minimizing the equation (cost function):

$$-1 + \frac{1}{a_z^2}(-b_z+z)^2 + \frac{1}{a_y^2}(-b_y+y)^2 + \frac{1}{a_x^2}(-b_x+x)^2 = 0. \quad (3)$$

The telemetry data 231-3 is shown as circles that represent the values acquired during the rolls of the towed object in two or more different headings. The circles in the telemetry data 231-3 form a relatively tight band because the data was acquired in an area subject to significant magnetic dip, which reduces the accuracy of the estimation of the bias and gain parameters of the axis perpendicular to the circles.

At block 236, the method can include using extracted parameters to calibrate the magnetometer for rotation, gain, bias, and skew. At block 238, the method can include rotating the magnetometer using the accelerometer data according to the equations:

$$y_{mnew} = y_m \cos(\theta) - z_m \sin(\theta)\text{sign}(\sin \varnothing); \text{ and} \quad (4)$$

$$z_{mnew} = y_m \sin(\theta)\text{sign}(\sin \varnothing) + z_m \cos(\theta). \quad (5)$$

At block 240, the method can include calibrating the compass for horizontal gain, bias, and skew by minimizing the equation (cost function):

$$\sin(2\varepsilon)\sin\left(2\tan^{-1}\left(\tan(\varepsilon) + \frac{a_y(-b_x+x)\tan(\varepsilon)}{a_x(-b_y+y)} + \frac{a_y(-b_x+x)}{a_x(-b_y+y)}\right)\right) - \\ 1 + \frac{1}{a_y^2}(-b_y+y)^2 + \frac{1}{a_x^2}(-b_x+x)^2 = 0 \quad (6)$$

Calibrating the compass for horizontal gain, bias, and skew can comprise correcting imperfections in the horizontal magnetic field determination. The telemetry data 231-4 is shown as circles that represent data points generated during straight towing of the towed object and during a turn. Adjusting the gain can change the shape that represents the data points (e.g., from an ellipse to a circle). The circles in the telemetry data 231-4 can be offset from the origin after the first calibration step. The second calibration step can shift the circles back to being origin centered, which can significantly improve the accuracy of the heading data. Offset from the origin can be corrected by adjusting the bias. At block 242, the method can include using the extracted parameters to calibrate the magnetometer for rotation, gain, bias, and skew.

Figure 3:
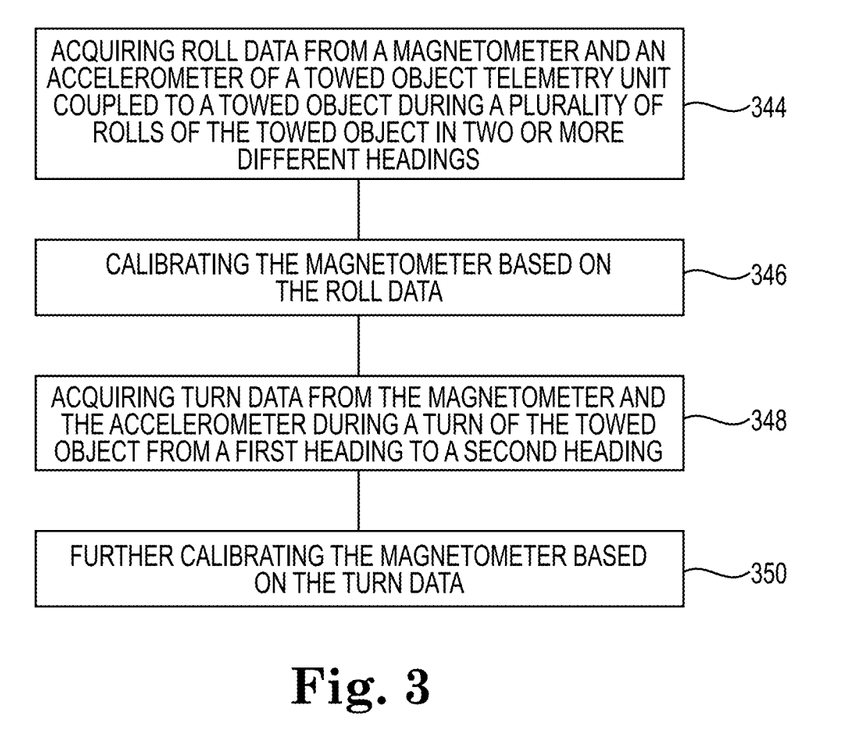
FIG. 3 illustrates a method flow diagram for calibration of a magnetometer in a towed object telemetry unit based on turn data.

FIG. 3 illustrates a method flow diagram for calibration of a magnetometer in a towed object telemetry unit based on turn data. In at least one embodiment, the method can be performed by a controller, such as the controller 166 illustrated in FIG. 1C. At block 344, the method can include acquiring roll data from a magnetometer and an accelerometer of a towed object telemetry unit coupled to a towed object during a plurality of rolls of the towed object in two or more different headings. For example, acquiring the roll data can include acquiring first roll data from the magnetometer and the accelerometer during a roll of the towed object in a first heading, acquiring second roll data from the magnetometer and the accelerometer during a roll of the towed object in a second heading, and acquiring third roll data from the magnetometer and the accelerometer during a roll of the towed object in a third heading. The roll of the towed object in any particular heading can include a single roll in a single direction, or multiple rolls in one or more directions. In at least one embodiment, each of the different headings can be different from each other by at least 30 degrees. For example, the first heading could be 315 degrees, the second heading could be 000 degrees, and the third heading could be 045 degrees, however embodiments are not limited to any particular heading.

At block 346, the method can include calibrating the magnetometer based on the roll data. In at least one embodiment, calibrating the magnetometer can include calibrating the magnetometer based on the first roll data, the second roll data, and the third roll data collectively. Calibrating the magnetometer based on the roll data can include adjusting bias and gain of the magnetometer such that the roll data fits a sphere.

At block 348, the method can include acquiring turn data from the magnetometer and the accelerometer during a turn of the towed object from a first heading to a second heading. Acquiring the turn data can include acquiring the turn data during a plurality of turns of the towed object. The plurality of turns can include right turns and left turns of various radii and turn rates. At block 350, the method can include further calibrating the magnetometer based on the turn data. Further calibrating the magnetometer based on the turn data can include adjusting bias and gain of the magnetometer such that the turn data scales to a circle.

Although not specifically illustrated in FIG. 3, the method can further include acquiring straight tow data from the magnetometer and the accelerometer during straight towing of the towed object. The further calibration of the magnetometer can include calibration based on the turn data and the straight tow data. In at least one embodiment, the further calibration based on the turn data and the straight tow data can be a calibration based on the turn data and the straight tow data together in the calibration. In at least one embodiment, the further calibration based on the turn data and the straight tow data can include calibration based on the turn data separate from calibration based on the straight tow data.

The calibration can be performed in an area to be geophysically surveyed. Performing the calibration in the area to be surveyed can help assure that the compass is calibrated correctly for the area in which marine survey data is to be gathered. It may be particularly beneficial to perform the calibration where the area is subject to significant magnetic dip, such as exceeding either +60 degrees (in the northern hemisphere) or −60 degrees (in the southern hemisphere) from zero. As magnetic dip increases, any error in the horizontal component of the compass readings can be magnified because the horizontal component of the magnetic field decreases relative to the vertical component. The horizontal component of the field is the relevant component for direction and navigation purposes. The calibration method described herein can calibrate the magnetometer based on the turn data to correct for the magnetic dip.

Figure 4:
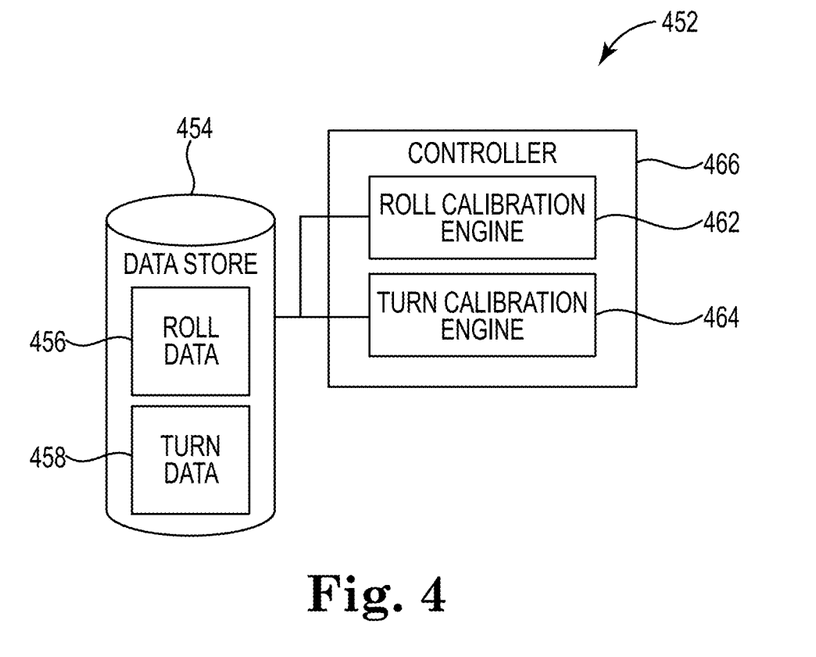
FIG. 4 illustrates a diagram of a system for calibration of a magnetometer in a towed object telemetry unit based on turn data.

FIG. 4 illustrates a diagram of a system for calibration of a magnetometer in a towed object telemetry unit based on turn data. The system 452 can include a data store 454, and a controller 466. The controller 466 can include engines, such as a roll calibration engine 462 and a turn calibration engine 464. The controller 466 and engines can be in communication with the data store 454 via a communication link. The system 452 can include additional or fewer engines than illustrated to perform the various functions described herein. The system can represent program instructions and/or hardware of a machine such as the machine 566 referenced in FIG. 5, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The engines can include a combination of hardware and program instructions that is configured to perform functions described herein. The program instructions, such as software, firmware, etc., can be stored in a memory resource such as a machine-readable medium, etc., as well as hard-wired program such as logic. Hard-wired program instructions can be considered as both program instructions and hardware.

The roll calibration engine 462 can include a combination of hardware and program instructions that is configured to perform a first calibration of a magnetometer by fitting roll data 456 from an ellipsoid to a sphere and reducing an offset of the roll data 456 from an origin of the sphere. The sphere is an example of what is referred to herein as an expected telemetry field shape, and may also be referred to as a unity sphere. The roll data 456 can be acquired from the magnetometer and an accelerometer during a plurality of rolls of a towed object that includes the magnetometer and the accelerometer in different headings. The roll data 456 can be stored in the data store 454.

The turn calibration engine 464 can include a combination of hardware and program instructions that is configured to perform a second calibration of the magnetometer by scaling turn data 458 from an ellipse to a circle and reducing an offset of the turn data 458 from an origin of the circle. The circle is an example of what is referred to herein as an expected telemetry field shape and may also be referred to as a unity circle. The turn data 458 can be acquired from the magnetometer and the accelerometer during a turn of the towed object from a first heading to a second heading and stored in the data store 454. In at least one embodiment, the turn data can be acquired during a plurality of turns of the towed objects from and to respective pluralities of different headings. The turn calibration engine can include a combination of hardware and program instructions that is configured to perform the second calibration by scaling the turn data and straight tow data (not specifically illustrated, but storable in the data store 454) from an ellipse to a circle and reducing an offset of the turn data and the straight tow data from an origin of the circle. The straight tow data can be acquired during straight towing of the towed object.

The roll calibration engine 462 and/or the turn calibration engine 464 can include a combination of hardware and program instructions that is configured to compensate data received from the magnetometer and the accelerometer for a mounting angle of the magnetometer and the accelerometer that is offset from a longitudinal axis of the towed object. The mounting angle offset 113 is illustrated in FIG. 1A and an example of how the offset is compensated for is provided at 228 in FIG. 2.

The controller 466 can include a combination of hardware and program instructions that is configured to determine gain and bias parameters of the magnetometer resulting from the second calibration and store the gain and bias parameters in the data store 454. For example, the gain and bias parameters can be determined by minimizing a cost function as described herein.

FIG. 5 illustrates a diagram of a machine 566 for calibration of a magnetometer in a towed object telemetry unit based on turn data. The machine 566 can utilize software, hardware, firmware, and/or logic to perform functions. The machine 566 can be a combination of hardware and program instructions configured to perform functions. The machine is also generally referred to herein as a controller, which is analogous to the controller 166 illustrated in FIG. 1C. The hardware, for example, can include processing resources 568 and memory resources 570, such as a machine-readable medium or other non-transitory memory resources 570. The memory resources 570 can be internal and/or external to the machine 566. For example, the machine 566 can include internal memory resources and have access to external memory resources. The program instructions, such as machine-readable instructions, can include instructions stored on the machine-readable medium to implement a particular function, for example, an action such as calibrating a magnetometer based on roll data or turn data. The set of machine-readable instructions can be executable by one or more of the processing resources 568. The memory resources 570 can be coupled to the machine 566 in a wired and/or wireless manner. For example, the memory resources 570 can be an internal memory, a portable memory, a portable disk, or a memory associated with another resource, for example, enabling machine-readable instructions to be transferred or executed across a network such as the Internet. As used herein, a "module" can include program instructions and/or hardware, but at least includes program instructions.

Memory resources 570 can be non-transitory and can include volatile and/or non-volatile memory. Volatile memory can include memory that depends upon power to store data, such as various types of dynamic random access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and a solid state drive, etc., as well as other types of non-transitory machine-readable media.

The processing resources 568 can be coupled to the memory resources 570 via a communication path 572. The communication path 572 can be local or remote to the machine 566. Examples of a local communication path 572 can include an electronic bus internal to a machine, where the memory resources 570 are in communication with the processing resources 568 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 572 can be such that the memory resources 570 are remote from the processing resources 568, such as in a network connection between the memory resources 570 and the processing resources 568. That is, the communication path 572 can be a network connection. Examples of such a network connection can include a local area network, wide area network, personal area network, and the Internet, among others.

As shown in FIG. 5, the machine-readable instructions stored in the memory resources 570 can be segmented into a plurality of modules 574 and 576 that when executed by the processing resources 568 can perform functions. As used herein a module includes a set of instructions included to perform a particular task or action. The modules 574 and 576 can be sub-modules of other modules. For example, the roll calibration module 574 can be a sub-module of the turn calibration module 576, or the roll calibration module 574 and the turn calibration module 576 can be contained within a single module. Furthermore, the modules 574 and 576 can comprise individual modules separate and distinct from one another. Examples are not limited to the specific modules 574 and 576 illustrated in FIG. 5. Although not specifically illustrated, the memory resources 570 can store (at least temporarily) roll data and turn data for operation thereon by the roll calibration module 574 and the turn calibration module 576.

Each of the modules 574 and 576 can include program instructions or a combination of hardware and program instructions that, when executed by a processing resource 568, can function as a corresponding engine as described with respect to FIG. 4. For example, the roll calibration module 574 can include program instructions or a combination of hardware and program instructions that, when executed by a processing resource 568, can function as the roll calibration engine 462. The turn calibration module 576 can include program instructions or a combination of hardware and program instructions that, when executed by a processing resource 568, can function as the turn calibration engine 464.

In accordance with at least one embodiment of the present disclosure, a geophysical data product may be produced. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore.

Figure 6:
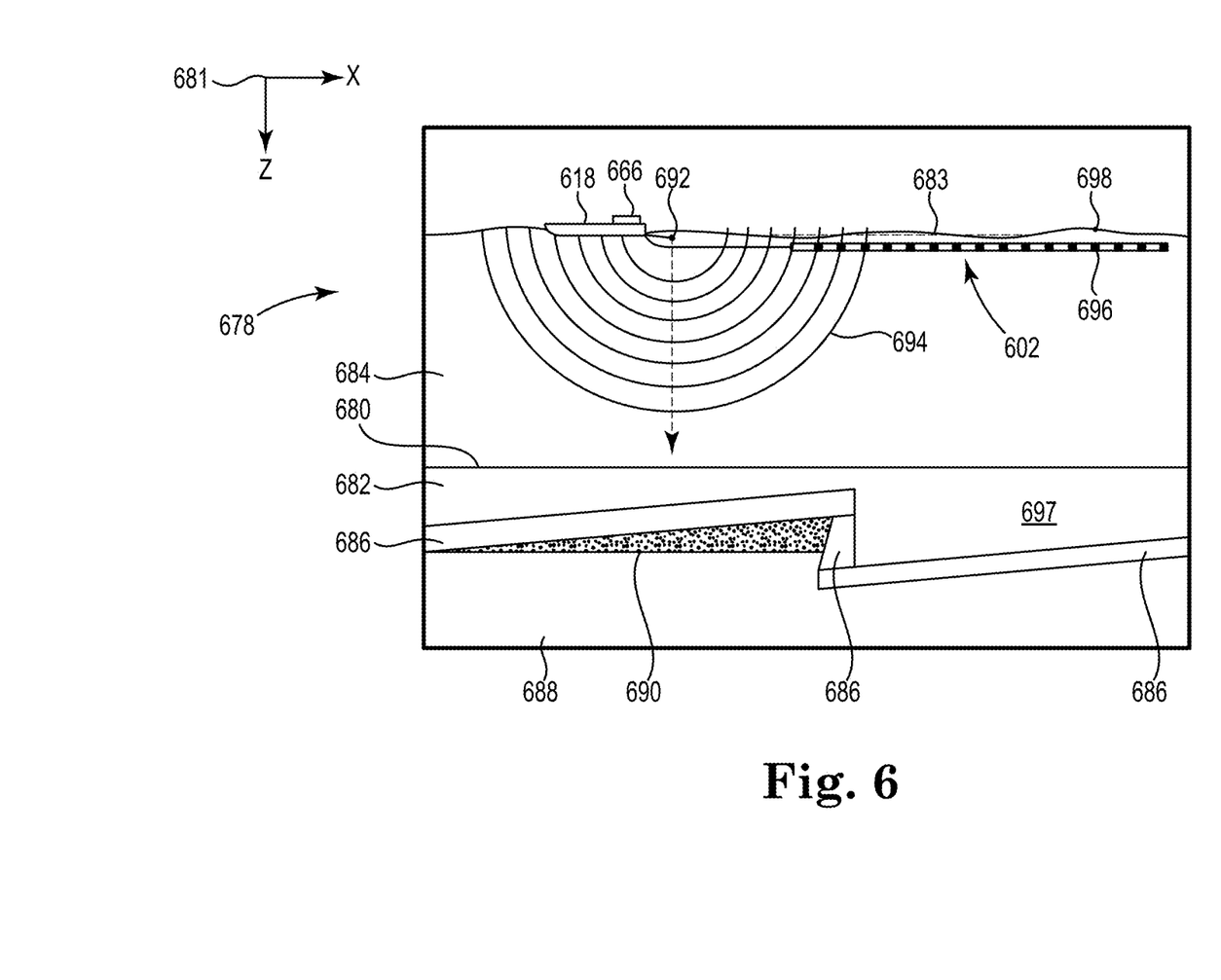
FIG. 6 illustrates a front elevation or xz-plane view of marine surveying in which acoustic signals are emitted by a source for recording by receivers.

FIG. 6 illustrates a front elevation or xz-plane 681 view of marine surveying in which acoustic signals are emitted by a source 692 for recording by receivers 696. The recording can be used for processing and analysis in order to help characterize the structures and distributions of features and materials underlying the surface of the earth. FIG. 6 illustrates a domain volume 678 of the earth's surface comprising a subsurface volume 682 of sediment and rock below the surface 680 of the earth that, in turn, underlies a fluid volume 684 of water having a water surface 698 such as in an ocean, an inlet or bay, or a large freshwater lake. The domain volume 678 shown in FIG. 6 represents an example experimental domain for a class of marine surveys. FIG. 6 illustrates a first sediment layer 697, an uplifted rock layer 686, second, underlying rock layer 688, and hydrocarbon-saturated layer 690. One or more elements of the subsurface volume 682, such as the first sediment layer 697 and the first uplifted rock layer 686, can be an overburden for the hydrocarbon-saturated layer 690. In some instances, the overburden may include salt.

FIG. 6 shows an example of a marine survey vessel 618 equipped to carry out marine surveys. In particular, the marine survey vessel 618 can tow one or more streamers 602 (shown as one streamer for ease of illustration) generally located below the water surface 683. The streamers 602 can be long cables containing power and data-transmission lines (electrical, optical fiber, etc.) to which receivers may be coupled. The streamers 602 can each include a towed object telemetry unit with a compass used for navigational purposes. The compass can be calibrated based on roll data and turn data acquired by the compass. In one type of marine survey, each receiver, such as the receiver 696 represented by the shaded disk in FIG. 6, comprises a pair of sensors including a geophone that detects particle displacement within the water by detecting particle motion variation, such as velocities or accelerations, and/or a hydrophone that detects variations in pressure. In one type of marine survey, each marine survey receiver, such as marine survey receiver 696, comprises an electromagnetic receiver that detects electromagnetic energy within the water. The streamers 602 and the marine survey vessel 618 can include sensing electronics and data-processing facilities that allow marine survey receiver readings to be correlated with absolute positions on the sea surface and absolute three-dimensional positions with respect to a three-dimensional coordinate system. In FIG. 6, the marine survey receivers along the streamers are shown to lie below the sea surface 683, with the marine survey receiver positions correlated with overlying surface positions, such as a surface position 698 correlated with the position of marine survey receiver 696. The marine survey vessel 618 can also tow one or more marine survey sources 692 that produce signals as the marine survey vessel 618 and streamers 602 move across the sea surface 683. Marine survey sources 692 and/or streamers 602 may also be towed by other vessels, or may be otherwise disposed in fluid volume 684. For example, marine survey receivers may be located on ocean bottom cables or nodes fixed at or near the surface 680, and marine survey sources 692 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes.

FIG. 6 shows source energy illustrated as an expanding, spherical signal, illustrated as semicircles of increasing radius centered at the marine survey source 692, representing a down-going wavefield 694, following a signal emitted by the marine survey source 692. The down-going wavefield 694 is, in effect, shown in a vertical plane cross section in FIG. 6. The outward and downward expanding down-going wavefield 694 may eventually reach the surface 680, at which point the outward and downward expanding down-going wavefield 694 may partially scatter, may partially reflect back toward the streamers 602, and may partially refract downward into the subsurface volume 682, becoming elastic signals within the subsurface volume 682.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A system, comprising:
   a first towed object telemetry unit including a first magnetometer, wherein the first towed object telemetry unit is coupled to a first section of a towed object;
   a second towed object telemetry unit including a second magnetometer, wherein the second towed object telemetry unit is coupled to a second section of the towed object;
   a first position control device coupled to the first section of the towed object;
   a second position control device coupled to the second section of the towed object; and
   a controller coupled to the towed object and configured to:
   use the first position control device to roll the first section of the towed object and receive first roll data from the first towed object telemetry unit;
   calibrate the first magnetometer based on the first roll data by adjusting bias and gain of the first magnetometer such that the first roll data fits a first sphere;
   use the second position control device to roll the second section of the towed object and receive second roll data from the second towed object telemetry unit;
   calibrate the second magnetometer based on the second roll data by adjusting bias and gain of the second magnetometer such that the second roll data fits a second sphere;
   receive first turn data from the first towed object telemetry unit and second turn data from the second towed object telemetry unit as a result of a turn of the towed object from a first predetermined heading to a second predetermined heading different than the first predetermined heading;
   further calibrate the first magnetometer based on the first turn data by adjusting bias and gain of the first magnetometer such that the first turn data scales to a first circle; and
   further calibrate the second magnetometer based on the second turn data by adjusting bias and gain of the second magnetometer such that the second turn data scales to a second circle.

2. The system of claim 1, wherein the controller is configured to receive first straight tow data from the first towed object telemetry unit and second straight tow data from the second towed object telemetry unit as a result of the towed object being towed without turning for a period of time;
   wherein the controller being configured to further calibrate the first magnetometer comprises the controller being configured to further calibrate the first magnetometer based on the first turn data and the first straight tow data; and
   wherein the controller being configured to further calibrate the second magnetometer comprises the controller being configured to further calibrate the second magnetometer based on the second turn data and the second straight tow data.

3. The system of claim 1, wherein the controller is onboard a marine survey vessel that is coupled to and configured to tow the towed object; and
   wherein the controller is configured to instruct the marine survey vessel to turn from the first predetermined heading to the second predetermined heading.

4. The system of claim 3, wherein the controller is configured to:
   adjust a plurality of wings of the first position control device to roll the first section of the towed object along its longitudinal axis;
   adjust a plurality of wings of the second position control device to roll the second section of the towed object along its longitudinal axis.

5. The system of claim 1, wherein the controller is configured to use the first position control device and the second position control device to turn the towed object from the first predetermined heading to the second predetermined heading.

6. The system of claim 1, wherein the first magnetometer comprises a tri-axis microelectromechanical system (MEMS) based magnetometer;

wherein the first magnetometer is mounted to the first towed object telemetry unit at an angle offset from a longitudinal axis of the towed object telemetry unit;
wherein the towed object telemetry unit is coupled to the towed object such that the longitudinal axis of the towed object telemetry unit generally aligns with a longitudinal axis of the towed object; and
wherein the controller is configured to compensate the first magnetometer for the angle offset.

7. A method, comprising:
using a first position control device to roll a first section of a towed object and receive first roll data from a first towed object telemetry unit coupled to the first section;
calibrating a first magnetometer of the first towed object telemetry unit based on the first roll data by adjusting bias and gain of the first magnetometer such that the first roll data fits a first sphere;
using a second position control device to roll a second section of the towed object and receive second roll data from a second towed object telemetry unit coupled to the second section;
calibrating a second magnetometer of the second towed object telemetry unit based on the second roll data by adjusting bias and gain of the second magnetometer such that the second roll data fits a second sphere;
receiving first turn data from the first towed object telemetry unit and second turn data from the second towed object telemetry unit as a result of a turn of the towed object from a first predetermined heading to a second predetermined heading different than the first predetermined heading;
further calibrating the first magnetometer based on the first turn data by adjusting bias and gain of the first magnetometer such that the first turn data scales to a first circle; and
further calibrating the second magnetometer based on the second turn data by adjusting bias and gain of the second magnetometer such that the second turn data scales to a second circle.

8. The method of claim 7, further comprising receiving first straight tow data from the first towed object telemetry unit and second straight tow data from the second towed object telemetry unit as a result of the towed object being towed without turning for a period of time;
further calibrating the first magnetometer based on the first turn data and the first straight tow data; and
further calibrating the second magnetometer based on the second turn data and the second straight tow data.

9. The method of claim 7, further comprising instructing a marine survey vessel to turn from the first predetermined heading to the second predetermined heading, wherein the marine survey vessel is coupled to and configured to tow the towed object.

10. The method of claim 9, further comprising:
adjusting a plurality of wings of the first position control device to roll the first section of the towed object along its longitudinal axis;
adjusting a plurality of wings of the second position control device to roll the second section of the towed object along its longitudinal axis.

11. The method of claim 7, further comprising using the first position control device and the second position control device to turn the towed object from the first predetermined heading to the second predetermined heading.

12. The method of claim 7, further comprising compensating the first magnetometer for an angle offset from a longitudinal axis of the towed object telemetry unit;
wherein the towed object telemetry unit is coupled to the towed object such that the longitudinal axis of the towed object telemetry unit generally aligns with a longitudinal axis of the towed object.

13. A non-transitory machine readable medium storing instructions executable by a processing resource to:
use a first position control device to roll a first section of a towed object and receive first roll data from a first towed object telemetry unit coupled to the first section;
calibrate a first magnetometer of the first towed object telemetry unit based on the first roll data by adjusting bias and gain of the first magnetometer such that the first roll data fits a first sphere;
use a second position control device to roll a second section of the towed object and receive second roll data from a second towed object telemetry unit coupled to the second section;
calibrate a second magnetometer of the second towed object telemetry unit based on the second roll data by adjusting bias and gain of the second magnetometer such that the second roll data fits a second sphere;
receive first turn data from the first towed object telemetry unit and second turn data from the second towed object telemetry unit as a result of a turn of the towed object from a first predetermined heading to a second predetermined heading different than the first predetermined heading;
further calibrate the first magnetometer based on the first turn data by adjusting bias and gain of the first magnetometer such that the first turn data scales to a first circle; and
further calibrate the second magnetometer based on the second turn data by adjusting bias and gain of the second magnetometer such that the second turn data scales to a second circle.

14. The medium of claim 13, further comprising instructions to:
receive first straight tow data from the first towed object telemetry unit and second straight tow data from the second towed object telemetry unit as a result of the towed object being towed without turning for a period of time;
further calibrate the first magnetometer based on the first turn data and the first straight tow data; and
further calibrate the second magnetometer based on the second turn data and the second straight tow data.

15. The medium of claim 13, further comprising instructions to instruct a marine survey vessel to turn from the first predetermined heading to the second predetermined heading, wherein the marine survey vessel is coupled to and configured to tow the towed object.

16. The medium of claim 15, further comprising instructions to:
adjust a plurality of wings of the first position control device to roll the first section of the towed object along its longitudinal axis;
adjust a plurality of wings of the second position control device to roll the second section of the towed object along its longitudinal axis.

17. The medium of claim 13, further comprising instructions to use the first position control device and the second position control device to turn the towed object from the first predetermined heading to the second predetermined heading.

* * * * *